United States Patent [19]
Choi et al.

[11] Patent Number: 5,657,146
[45] Date of Patent: Aug. 12, 1997

[54] OPTICAL SCANNING APPARATUS

[75] Inventors: Min-ho Choi, Kyungki-do; Chul-woo Lee, Seoul; Young-gi Kim, Kyungki-do, all of Rep. of Korea

[73] Assignee: Samsung Electronics Co., Ltd., Suwon, Rep. of Korea

[21] Appl. No.: 587,940

[22] Filed: Jan. 17, 1996

[30] Foreign Application Priority Data

Feb. 25, 1995 [KR] Rep. of Korea .................. 95-3762

[51] Int. Cl.⁶ .................................................. G02B 26/08
[52] U.S. Cl. .......................... 359/205; 359/206; 359/207; 359/216
[58] Field of Search ............................. 359/205–207, 359/216–219, 662, 711, 716, 784, 796, 797; 347/258–261; 358/474, 494

[56] References Cited

U.S. PATENT DOCUMENTS

| | | | |
|---|---|---|---|
| 3,750,189 | 7/1973 | Fleischer | 359/206 |
| 3,946,150 | 3/1976 | Grafton | 359/218 |
| 4,379,612 | 4/1983 | Matsuoka et al. | 359/218 |
| 4,756,584 | 7/1988 | Takanashi | 359/207 |
| 5,136,412 | 8/1992 | Makino | 359/206 |
| 5,245,462 | 9/1993 | Kanai et al. | 359/206 |

*Primary Examiner*—James Phan
*Attorney, Agent, or Firm*—Foley & Lardner

[57] ABSTRACT

An optical scanning apparatus for scanning a light beam as a spot image on an image-forming plane apart from a light source, or reversely, for optically reading the graphic image of an object, in which stable high-resolution scanning is embodied. The apparatus includes a light source for providing a collimated beam, a cylindrical lens for linear focusing of the beam in a subscanning direction, a deflector for deflecting the beam in the main scanning direction, plastic toroidal lenses for image-forming the deflected beam and for focusing it to form a spot image, so that the three toroidal lenses have a small $F_{No}$ and compensate for the tilted mirror surface of the deflector, and allows stable scanning with high resolution that produces high-quality images in optical apparatus such as laser printers and facsimile machines.

17 Claims, 4 Drawing Sheets

CURVATURE OF FIELD IN MAIN SCANNING DIRECTION(mm)

CURVATURE OF FIELD IN SUBSCANNING DIRECTION(mm)

LINEARITY(%)

OPTICAL SCANNING APPARATUS

BACKGROUND OF THE INVENTION

1. Field of the Invention

The present invention relates to an optical scanning system and, in general, relates to an optical scanning system used with various types of optical scanning apparatus for scanning a light beam as a spot image on an image-forming plane separated from the light source, or reversely, for optically reading the graphic image of an object and, more particularly, relates to an optical scanning apparatus in which high-resolution scanning is stably embodied.

2. Description of Related Art

Generally, an optical scanning apparatus installed in a laser printer, a facsimile, etc., consists of a semiconductor laser as a light source, a rotary polygon mirror as a deflector, and a plurality of lenses respectively arranged between the semiconductor laser and the rotary polygon mirror and between the rotary polygon mirror and the image-forming plane (light-sensing drum). The scanned light beam of such optical scanning apparatus is generally described as being divided into a main scanning direction and a subscanning direction. Here, the main scanning direction signifies the direction of a light beam scanned by deflection on a perpendicular plane to any point on a scanning optical axis, and the subscanning direction signifies a direction perpendicular to the main scanning direction. Also, the optical systems of an optical scanning apparatus are described as being divided, according to the scanning direction, into a first optical system in which optical performance is characterized by the main scanning direction, and a second optical system characterized by the subscanning direction. In other words, the first optical system is referred to as the section in which a beam emitted from a light source is shaped in the main scanning direction, and the function of forming the shaped beam onto an image-forming plane is performed after the shaped beam is deflected at a deflector (rotary polygon mirror). The second optical system is referred to as the section in which a beam emitted from a light source is focused onto the deflector in the subscanning direction and the function of forming the deflected beam onto an image-forming plane is performed.

To produce a high-resolution scan in an optical scanning apparatus, a means for controlling the scanning line pitch error which occurs because the mirror surfaces of the polygon mirror deflector are tilted with respect to the subscanning direction when the rotary optical polygon deflector rotates must be taken into consideration. Accordingly, a method for compensating for the tilting of the mirror surface to the subscanning direction is required. In general, an optical system is designed where a light beam is focused on the mirror surface of a deflector in the subscanning direction and is shaped in the main scanning direction, and the deflector and the image-forming plane are in a conjugate relationship in the subscanning direction in the optical system for image-forming.

For example, in U.S. Pat. No. 3,750,189, an optical system for image-forming is composed of a beam shaping means and a focusing means. Namely, a beam emitting and reflecting after focusing on a deflector is shaped, and focused again to form a point-image on an image-forming plane. In the beam shaping means, many lenses are required because the freedom in design for concurrently achieving a uniform scan function and a point-image-forming function is restricted.

In U.S. Pat. No. 3,946,150, a conjugation relationship between a deflector and an image-forming plane is made by arranging a long cylindric lens in the scanning direction between a lens having a uniform scan function and the image-forming plane. In this structure, the lens itself must be quite large because good beam-quality cannot be acquired if the cylinder-type lens is not located near the image-forming plane, and if the scan width is wide, realization of the image forming system itself cannot be attained.

In U.S. Pat. No. 4,379,612, an optical system for image-forming consists of a spherical single lens and a toroidal single lens so as to correct plane-tilting and reflection-point-wandering on a deflection surface. However, the two-lens structure cannot correct beam spread in the main scanning direction, and thus, there is a problem of not being able to achieve a high-resolution scan.

In U.S. Pat. No. 5,136,412, an optical system for high-resolution scanning consists of two spherical lenses, a toroidal lens and an air lens-well adjusted between the two lenses. However, compared with usual optical systems, to obtain a convex air lens that maintains a tight air gap is difficult with an image-forming lens having a large diameter, and thus, this optical system is not appropriate to forming a stable point-image.

SUMMARY OF THE INVENTION

To solve the above problems, it is an object of the present invention to provide an optical scanning apparatus embodying a high-resolution scan in an optical system that compensates for the tilt of a deflector and also forms a fine spot image.

It is another object of the present invention to provide an optical scanning apparatus embodying a high-resolution scan in an optical system that corrects for reflecting point movement in the deflector, as well as performing the correction function of the tilting of the deflector.

It is still another object of the present invention to provide an optical scanning apparatus that can perform a high-resolution scan of a spot image at uniform speed with high position accuracy.

These and additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, there is provide an optical scanning apparatus comprising a light source; a first lens group for collimating and linearly imaging with respect to subscanning direction of the light beam provided from the light source; a deflector for deflecting the light beam passed through the first lens group in the main scanning direction; a second lens group for image-forming the deflected light beam on the image-forming plane, wherein the second lens group is provided with three toroidal lenses, each lens having toric surface.

Preferably, the three toroidal lenses include, in proceeding order from the deflector along the optical axis to the main and subscanning direction, a first lens of a negative power and second and third lenses of a positive power. Preferably, the refractive power of the lens having a negative power is larger in an absolute value than the refractive power of the lens having a positive power.

The first lens group may include a cylindrical lens for advancing the light beam in the main scanning direction and focusing linearly the light beam on the deflection plane of said deflector in a subscanning direction. The second lens group may have a small combined $F_{No}$ of about 30, wherein $F_{No}$ is the ratio of focal length in the main scanning direction with respect to an effective beam diameter.

It is to be understood that both the foregoing general description and the following detailed description are exemplary and explanatory only and are not restrictive of the invention, as claimed.

The accompanying drawings, which are incorporated in and constitute a part of this specification, illustrate an embodiment of the invention and together with the description, serve to explain the principles of the invention. Wherever possible, the same reference numbers will be used throughout the drawings to refer to the same or like parts.

DETAILED DESCRIPTION OF THE INVENTION

Figure 1:
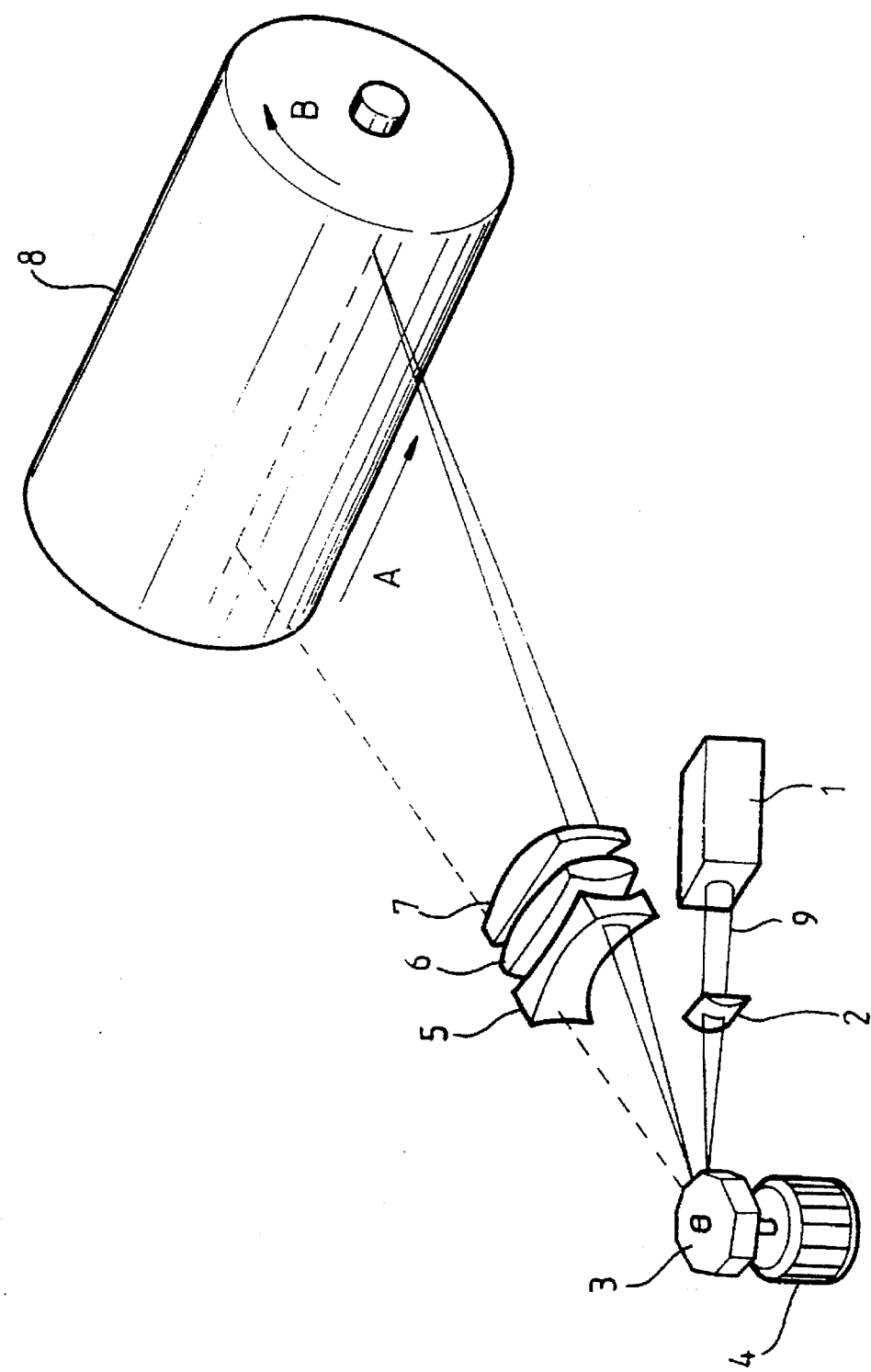
FIG. 1 is a perspective view of a schematic representation of the optical scanning apparatus according to the present invention.

As shown in FIG. 1, the optical scanning apparatus according to an embodiment of the present invention consists of a light beam generator 1, cylindrical lens 2, rotary polygon mirror 3 as a deflector, motor 4 for rotating rotary polygon mirror 3, and three composite toroidal lenses 5, 6 and 7. A light sensitive drum 8 as an image-forming plane is also shown in the drawing. Here, light beam generator 1 includes a light source for providing a light beam and an optical system for shaping the light beam.

In the configuration of the above scanning apparatus as shown in FIG. 1, the first lens group of the present invention is made up of the optical system comprising the light source 1 and cylindrical lens 2 which focuses light on the mirror surface (numeral omitted) of rotary polygon mirror 3 in a sub-scanning direction, and the second lens group is made up of three composite toroidal lenses 5, 6 and 7 for image-forming.

Figure 2:
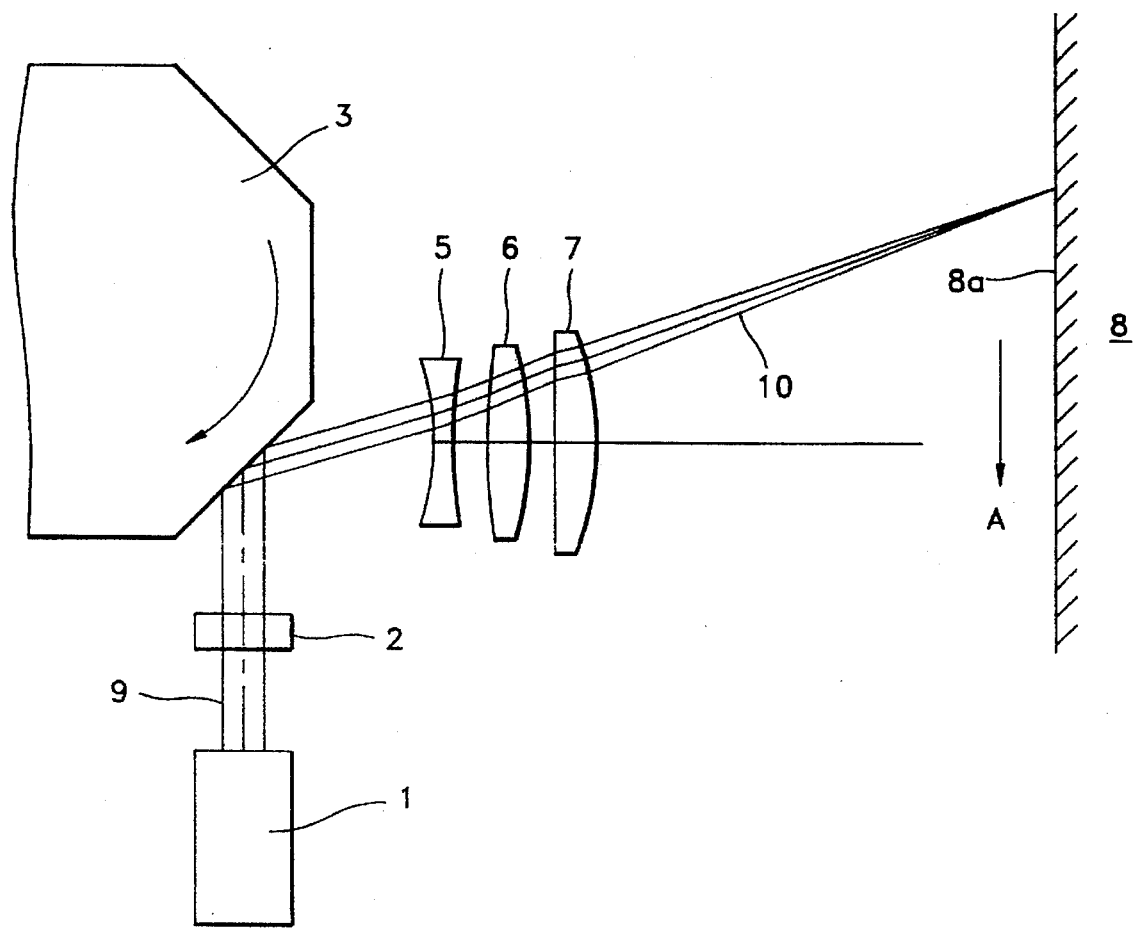
FIG. 2 is a plan view of a schematic representation of the optical scanning apparatus according to the present invention.
Figure 3:
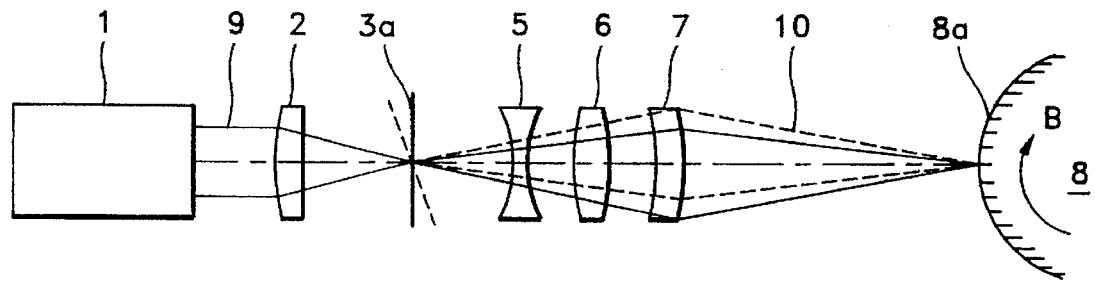
FIG. 3 is a side, elevational view of a schematic representation of the optical scanning apparatus according to the present invention.

Beam 9 is collimated and emitted from light beam generator 1 and passes through cylindrical lens 2 in the main scan direction, as shown in FIG. 2, and is refracted and focused linearly in the subscanning direction onto the surface of the rotary polygon mirror 3 and spread therefrom as shown in FIG. 3. Beam 9 is modulated by the internal/external method to scan a desired graphic image on light sensitive drum 8 as the image-forming plane.

The rotary polygon mirror 3 as a deflector rotates at a uniform speed as driven by motor 4 (FIG. 1), and according to the rotation of rotary polygon mirror 3, deflects the incident beam at a uniform speed in the main scanning direction, i.e., in direction A as shown in FIGS. 1 and 2.

Referring to FIGS. 2 and 3, three toroidal lenses 5, 6 and 7 are composed for image-forming focusing the beam deflected by rotary polygon mirror 3 onto light sensitive drum 8 to form a spot image in the main scanning direction and the sub-scanning direction perpendicular thereto.

Thus, light sensitive drum 8 is scanned linearly by beam 10 image-formed through three toroidal lenses 5, 6 and 7 after deflection by the rotation of rotary polygon mirror 3, and forms the graphic image according to the modulation of the beam on the scanned line as a spot image. Light sensitive drum 8 is rotated by a motor (not shown) in synchronization with rotary polygon drum 3 so as to be rotated continuously or intermittently as desired in direction B as shown in FIGS. 1 and 3 for second scanning after exposed to one horizontal scan line scanned in the main scanning direction.

The above three toroidal lenses 5, 6 and 7 show an optical specification for image-forming of the deflected beam in the main scanning direction and the subscanning direction, respectively, as shown in FIGS. 2 and 3. Specifically, as shown in FIG. 3, there is a conjugative relationship between the mirror surface 3a of the rotary polygon mirror as a deflection plane and the surface 8a of light sensitive drum 8 as an image-forming plane, since the refractive power in the subscanning direction is different from the main scanning direction as shown in FIG. 3. Hence, even if mirror surface 3a is tilted as an imaginary line, the image-forming position on the surface 8a of light sensitive drum 8 does not change.

In three toroidal lenses 5, 6 and 7, the aperture ratio of each lens element is 1:30, which is relatively larger than conventional ratios. In the lens element design, the aberrations subject to correction are mainly field curvatures and distortions.

Specifically, for the precise correction of the curvature of field in the main scanning direction, the toroidal lenses 5, 6 and 7 of the present invention are respectively made up of a lens 5 having negative refractive power and lenses 6 and 7 having positive refractive power. Further, the curvature of field can be easily corrected by increasing the absolute value of the refractive power in the first lens 5 more than the second lens 6 so that a negative power is exhibited by the composite system.

Consequently, owing to the combination of such toroidal lenses 5, 6 and 7, the function of $f_\theta$ lens for scanning the surface 8a of the light sensitive drum with a spot of a constant size is fully achieved, regardless of the above-mentioned angle change of rotary polygon drum 3.

Preferably, toroidal lenses 5, 6 and 7 are manufactured with plastics with a refractive ratio of about 1. Accordingly, a surface of each lens which becomes a toric surface with respect main scanning and subscanning directions can be manufactured into an aspherical surface answering to required optical properties, and mass injection molding by metal mold is possible, providing economic profit.

Figure 4:
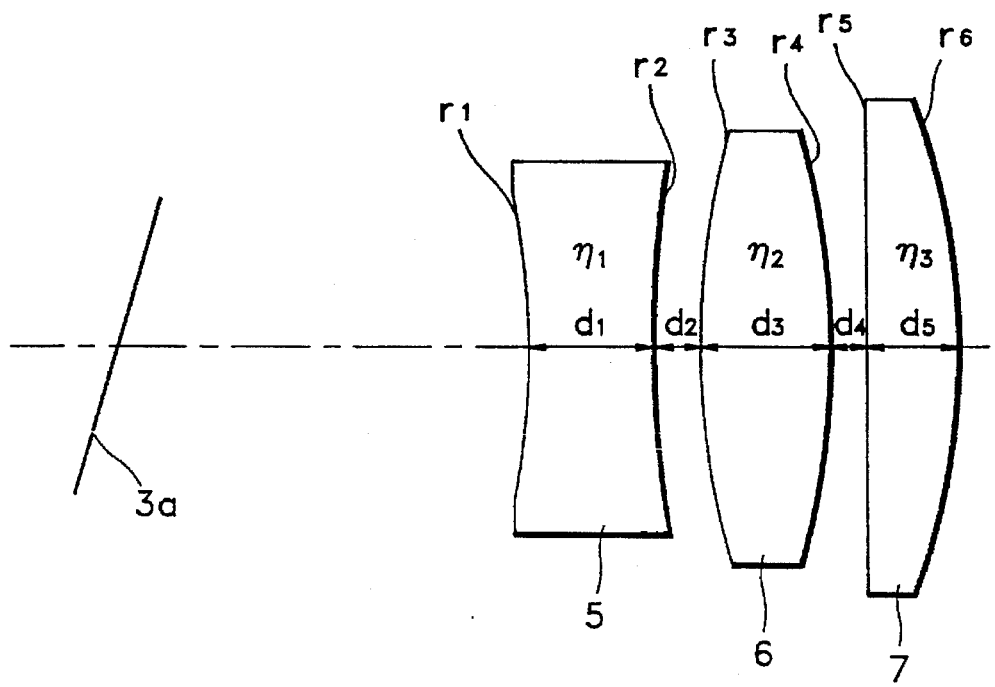
FIG. 4 is a view of the lens profile of the image-forming optical system employed in the optical scanning apparatus according to the present invention, shown on a plane to the main scanning direction.
Figure 5:
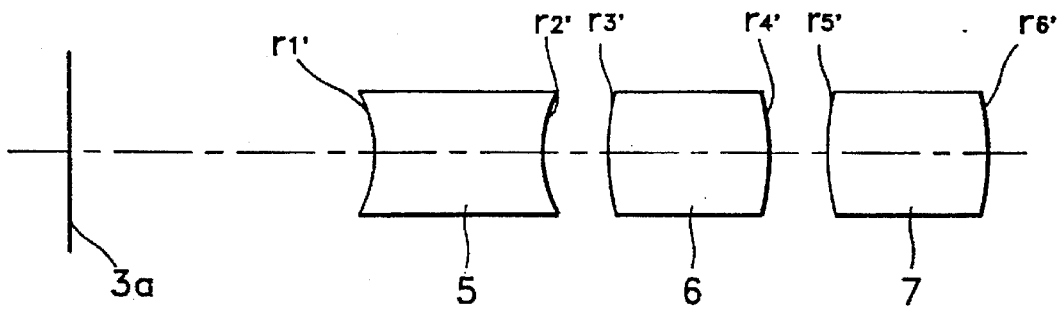
FIG. 5 is a view of the lens profile of the image-forming optical system employed in the optical scanning apparatus according to the present invention, shown on a plane to the subscanning direction.

The following Table I shows lens data which is applied to the optical system for image-forming for a high-resolution scan. In the table, in proceeding order from mirror surface 3a as shown in FIG. 4, $r_1$–$r_6$ signify a radius of curvature in the main scanning direction for each surface, and $r_1'$-$r_6'$ signify a radius of curvature in the subscanning direction for each surface as shown in FIG. 5. Also, $d_1$, $d_3$ and $d_5$ signify the medium thickness of each lens 5, 6 and 7 on the optical axis, and $d_2$ and $d_4$ signify the air gaps between each lens measured on the optical axis. Further, $n_1$-$n_3$ signify the refractive index of each lens; $\lambda$ denotes optical wavelength of a beam; $f_{NO}$ denotes ratio (f/D) of focal length (f) of the main scanning direction with respect to effective beam diameter (D); and $f_M$ denotes a combined focal length of the entire lens system in the main scanning direction. Further, $2\omega$ denotes an angle of view (unit: degree)

TABLE I $\lambda = 780$ nm   $F_{NO} = 30.67$   $2\omega = 44$ deg.   $f_M = 429.37$

RADIUS OF CURVATURE

| | MAIN SCANNING PLANE | | SUBSCANNING PLANE | THICKNESS | | REFRACTIVE INDEX |
| --- | --- | --- | --- | --- | --- | --- |
| $r_1$ | −112.9178 | $r_1'$ | −15.0000 | $d_1$ 17 | $n_1$ | 1.484 |
| $r_2$ | 267.7744 | $r_2'$ | 14.3700 | $d_2$ 7 | | |
| $r_3$ | 373.5867 | $r_3'$ | 196.3000 | $d_3$ 20 | $n_2$ | 1.484 |
| $r_4$ | −164.6434 | $r_4'$ | −42.5100 | $d_4$ 5 | | |
| $r_5$ | ∞ | $r_5'$ | 57.2204 | $d_5$ 20 | $n_3$ | 1.484 |
| $r_6$ | −154.7648 | $r_6'$ | −60.1900 | | | |

Figure 6A:
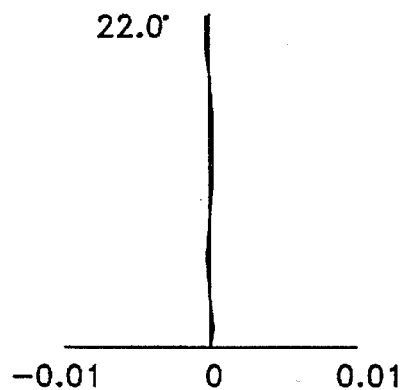
FIGS. 6A, 6B and 6C are graphs showing various aberration properties of the image-forming optical system employed in the optical scanning apparatus according to the present invention. The curvature of field in the main scanning direction is shown in FIG. 6A, the curvature of field in the subscanning direction is shown in FIG. 6B, and linearity is shown in FIG. 6C.
Figure 6B:
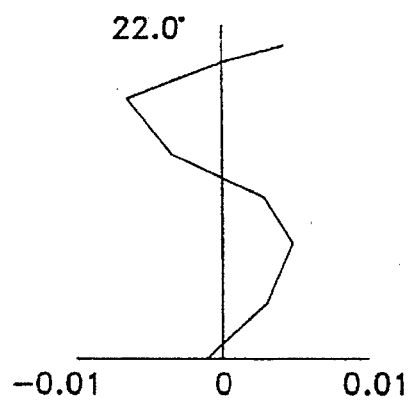
Figure 6C:
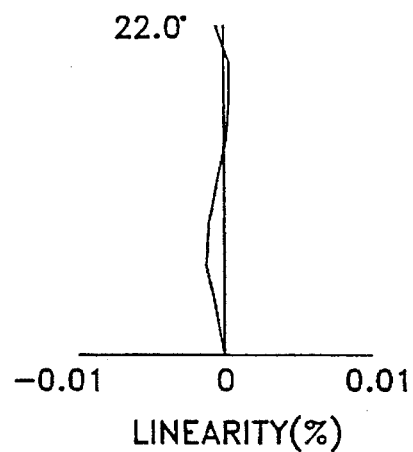

As a result of the embodiment of the above data, FIGS. 6A and 6B show the aberrations of field curvature in the main scanning direction and in the subscanning direction, respectively. FIG. 6C shows the aberration of distortion.

As explained above, the present invention is an optical scanning apparatus having an optical system designed to be capable of fine image-forming and to compensate for the deflection plane tilt of a deflector, and for the realization of a high-resolution scan. In the configuration of the present invention, the number of required lenses is less than conventional systems so that the product cost can be reduced, and the miniaturization of the system can be possible by arranging the optical system closer to the deflector. Especially, in a laser printer or a facsimile, stable driving, high-quality and fast printing can be possible by applying the present invention.

Other embodiments of the invention will be apparent to those skilled in the art from consideration of the specification and practice of the invention disclosed herein. It is intended that the specification and examples be considered as exemplary only, with true scope and spirit of the invention being indicated by the following claims.

What is claimed is:

1. An optical scanning apparatus for scanning an image-forming plane with a light beam, comprising:

a light source for providing a light beam;

a first lens group for linearly focusing the light beam provided from said light source;

a deflector for deflecting the light beam passed through said first lens group in the main scanning direction;

a second lens group for image-forming the light beam deflected by said deflector on the image-forming plane, wherein said second lens group has a small combined $F_{NO}$ of about 30, wherein $F_{NO}$ is the ratio of focal length in the main scanning direction with respect to an effective beam diameter.

2. An optical scanning apparatus as claimed in claim 1, wherein said second lens group is provided with three toroidal lenses to provide a positive optical power.

3. An optical scanning apparatus as claimed in claim 2, wherein said three toroidal lenses include at least one lens of a negative power and at least one lens of a positive power in an order from said deflector to a scanning plane in the main scanning direction and a subscanning direction, respectively.

4. An optical scanning apparatus as claimed in claim 3, wherein the refractive power of said lens having a negative power is larger in an absolute value than the refractive power of said first lens having a positive power.

5. An optical scanning apparatus as claimed in claim 1, wherein said first lens group includes a cylindrical lens for advancing the light beam in the main scanning direction and focusing linearly the light beam on a deflection plane of said deflector in a subscanning direction.

6. An optical scanning apparatus for scanning an image-forming plane with a light beam, comprising:

a light source for providing a light beam;

a first lens group for linearly focusing the light beam provided from said light source;

a deflector for deflecting the light beam passed through said first lens group in a main scanning direction, and a second lens group for image-forming the light beam deflected by said deflector on the image-forming plane, wherein said second lens group has a small combined $F_{NO}$ of about 30, wherein $F_{NO}$ is the ratio of focal length in the main scanning direction with respect to an effective beam diameter, and each lens of said second lens group is comprised of plastic.

7. An optical scanning apparatus as claimed in claim 6, wherein said second lens group is provided with three toroidal lenses to provide a positive optical power and said three toroidal lenses include at least one lens of a negative power and at least one lens of a positive power in an order from said deflector to a scanning plane in the main scanning direction and a subscanning direction, respectively.

8. An optical scanning apparatus as claimed in claim 7, wherein the refractive power of said lens having a negative power is larger in an absolute value than the refractive power of said first lens having a positive power.

9. An optical scanning apparatus as claimed in claim 6, wherein said first lens group includes a cylindrical lens for advancing the light beam in the main scanning direction and focusing linearly the light beam on a deflection plane of said deflector in a subscanning direction.

10. An optical scanning apparatus for scanning an image-forming plane with a light beam, comprising:

a light source for providing a light beam;

a first lens group for linearly focusing the light beam provided from said light source;

a deflector for deflecting the light beam passed through said first lens group in a main scanning direction; and a second lens group for image-forming the light beam deflected by said deflector on the image-forming plane, wherein said second lens group has a small combined $F_{NO}$ of about 30, and $F_{NO}$ is the ratio of focal length in the main scanning direction with respect to an effective beam diameter, and each lens of said second lens group has a same refractive index value.

11. An optical scanning apparatus as claimed in claim 10, wherein said second lens group is provided with three toroidal lenses to provide a positive optical power and said three toroidal lenses include at least one lens of a negative power and at least one lens of a positive power in an order from said deflector to a scanning plane in the main scanning direction and a subscanning direction, respectively.

12. An optical scanning apparatus as claimed in claim 11, wherein the refractive power of said lens having a negative power is larger in an absolute value than the refractive power of said first lens having a positive power.

13. An optical scanning apparatus as claimed in claim 10, wherein said first lens group includes a cylindrical lens for advancing the light beam in the main scanning direction and focusing linearly the light beam on a deflection plane of said deflector in a subscanning direction.

14. An optical scanning apparatus, comprising:

a light source for emanating a light beam;

a first focusing optical system for focusing the light beam as a linear image;

a light deflector for deflecting the light beam from said first focusing optical system; and a second focusing optical system for focusing the light beam deflected by said light deflector onto a medium to be scanned, said second focusing optical system comprising a first toroidal lens having a negative refractive power, a second toroidal lens having a positive refractive power, and a third toroidal lens having a positive refractive power, successively arranged in order from said light deflector toward said medium, wherein each of said first, second, and third toroidal lens have a same refractive index value.

15. An optical scanning apparatus as claimed in claim 14, wherein the refractive index value is equal to about 1.484.

16. An optical scanning apparatus as claimed in claim 14, wherein a thickness of said second toroidal lens is equal to the thickness of said third toroidal lens.

17. An optical scanning apparatus as claimed in claim 14, wherein said second focusing optical system has a F-number of about 30.

* * * * *